United States Patent [19]

André et al.

[11] 3,906,383

[45] Sept. 16, 1975

[54] METHOD AND DEVICE FOR AUTOMATIC CORRECTION OF HARMONIC DISTORTION

[75] Inventors: Pierre André, Lyon; Claude Duolé; Wladimir Stadnikoff, both of Gradignan, all of France

[73] Assignee: Commissariat a l'Energie Atomique, Paris, France

[22] Filed: Oct. 16, 1973

[21] Appl. No.: 406,837

[30] Foreign Application Priority Data

Oct. 27, 1972 France .............................. 72.38252

[52] U.S. Cl. .................................. 328/163; 328/165

[51] Int. Cl.[2] .......................................... H04B 15/04

[58] Field of Search ...................... 328/162, 163, 165

[56] References Cited

UNITED STATES PATENTS

| | | | |
|---|---|---|---|
| 3,299,362 | 1/1967 | Sandberg | 328/163 |
| 3,404,229 | 10/1968 | Downey et al. | 328/163 X |
| 3,421,089 | 1/1969 | Lyghounis | 328/163 X |
| 3,701,028 | 10/1972 | Markevich | 328/162 X |

*Primary Examiner*—John S. Heyman

*Attorney, Agent, or Firm*—Cameron, Kerkam, Sutton, Stowell & Stowell

[57] ABSTRACT

The distortions caused by each harmonic of the periodic signal delivered by a controlled system each undergo cyclic correction which consists in measuring the distortion factor of the emitted signal corresponding to the $n^{th}$ harmonic under consideration, in producing a periodic correcting signal having a frequency $nF$ in synchronism with the control signal, in deriving the signal representing the amplitude of the distortion by reversing the direction of variation of the phase shift and of the amplitude of the correcting signal each time the derivative passes from the minus sign to the plus sign and by endowing the variations of the correcting signal both in phase and in amplitude with a velocity which varies linearly with the measured harmonic ratio, in superposing the correcting signal thus treated on the control signal at the input of the system.

5 Claims, 5 Drawing Figures

METHOD AND DEVICE FOR AUTOMATIC CORRECTION OF HARMONIC DISTORTION

This invention relates to a method and a device which provide automatic compensation for distortion in a control chain.

More precisely, the present invention is concerned with means for eliminating parasitic harmonics appearing in the useful periodic signal delivered by a system which is also controlled by a periodic signal.

This is the case in particular with electrohydraulic jacks employed in vibration tests. A sine-wave control signal is applied to the input of an apparatus of this type in order to obtain a sinusoidal law of acceleration of the piston. It is found, however, that the acceleration is not a pure sinusoid and that there is a high distortion factor. In fact, the non-linearity of the electrohydraulic system gives rise to parasitic harmonic components in the acceleration of the piston and the components have to be eliminated.

The harmonic components just mentioned are of variable order. Furthermore, they have an amplitude and phase shift with respect to the fundamental which are dependent on the nature of the vibrator and of the specimen to be tested. No provision can therefore be made for any correcting system which is permanently incorporated in the apparatus since the correction also depends on the specimen to be tested.

The present invention is precisely directed to a method and a device which make it possible to carry out the harmonic correction irrespective of the type of apparatus employed and the specimen under study.

The method of correction consists in correcting separately the distortions caused by each harmonic and the cyclic correction of each harmonic entails the following operations:

a measurement is taken of the distortion factor of the emitted signal corresponding to the $n^{th}$ harmonic under consideration, there is produced a periodic correcting signal having a frequency nF in synchronism with the control signal, the signal representing the amplitude of the distortion is derived by reversing the direction of variation of the phase shift and of the amplitude of the correcting signal each time the derivative passes from the minus sign to the plus sign and by endowing the variations of the correcting signal both in phase and in amplitude with a velocity which varies linearly with the measured harmonic ratio, the correcting signal thus treated is superposed on the control signal at the input of the system.

In accordance with a further characteristic feature of the method, the phase shift of the correcting signal and the amplitude of said signal are caused to vary in alternate sequence.

In other words, the method consists in producing a correcting signal having a frequency $n$F (if it is desired to correct the $n^{th}$ harmonic in the emitted signal) in which the phase shift with respect to the control signal and the amplitude are such that the $n^{th}$ harmonic disappears in the emitted signal, adjustment of the phase shift and of the amplitude of the correcting signal being carried out automatically in dependence on the measurement of the distortion factor in the case of the harmonic under consideration. In this method, action is produced in parallel on the different harmonics to be eliminated from the emitted signal.

It should be pointed out at this stage that two parameters of the correcting signal must be modified, namely its amplitude and its phase shift with respect to the control signal. The variations in these two parameters have an action on the variation in the harmonic ratio; it is practically impossible, however, to decouple these two effects. It is therefore necessary to produce action alternately on one and then on the other while endeavoring each time to achieve a reduction in the distortion factor.

It should also be noted that only the directions of progressive variation in amplitude and in phase are of any consequence and not the absolute values of said parameters since it is sought only to minimize the harmonic ratio in the emitted signal.

The device is characterized in that it comprises a plurality of regulating loops, wherein each loop corresponds to the elimination of one harmonic of the characteristic signal delivered by the system to be regulated and each loop comprises:

means for producing a signal H which is proportional to the distortion factor of the characteristic signal corresponding to the $n^{th}$ harmonic, means for deriving the signal H, means for detecting the passage of the derivative of the signal H from the minus sign to the plus sign and for emitting a pulse I at each detection, means for producing a correcting signal in synchronism with the control signal of the system and having a frequency $nF$, means for varying in alternate sequence the amplitude and the phase shift of the correcting signal with respect to the control signal, the rate of variation being linearly related to the amplitude of the signal H and the direction of variation being reversed at each pulse I delivered by the detection means, means whereby the correcting signal thus treated is superposed on the control signal at the input of the system.

A better understanding of the invention will in any case be obtained from the following description of one embodiment of the invention which is given by way of non-limitative example, reference being made to the accompanying figures, in which.

Figure 1:
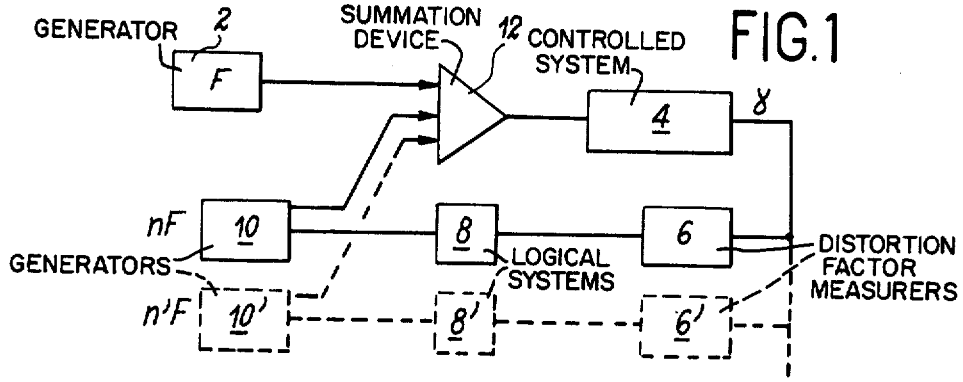
FIG. 1 is a block diagram illustrating the method according to the invention.
Figure 2:
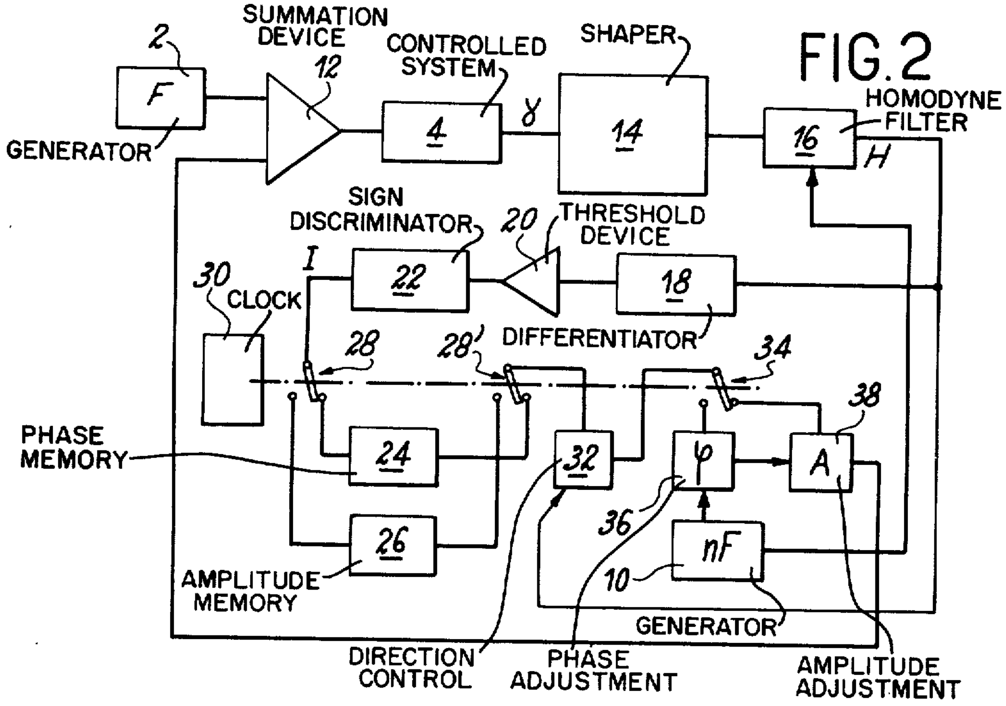
FIG. 2 is a block diagram of the device.

FIG. 1 is a diagrammatic illustration of the method according to the invention and shows a generator 2 which produces an alternating voltage having a frequency F and serves to control the system 4 (e.g. an electrohydraulic jack). There is collected at the output of said system 4 a signal which is characteristic of the operation of the system such as the acceleration $\gamma$, for example, and which is a sine-wave signal having a fundamental frequency F but containing harmonics.

In the device 6, the distortion factor of the signal $\gamma$ is measured in the case of the $n^{th}$ harmonic. By means of the logical system 8, action is produced as a function of this measurement on the phase and the amplitude of the sine-wave signal having a frequency nF which is delivered by the generator 10. The signal of frequency nF or correcting signal which is thus adjusted is superposed on the control signal of frequency F by means of the summation device 12. As stated earlier, the adjustment is carried out alternately on the phase and on the amplitude of the signal having a frequency nF.

A regulating loop is thus obtained since the devices 6 and 8 produce an adjustment of the amplitude and the phase of the signal of frequency nF such that said signal prevents the creation of the harmonic of the order $n$ in the system 4. The regulating system thus progresses towards a position of equilibrium which corresponds to cancellation of the harmonic of the order $n$ in the signal emitted by the system 4.

In the case of another harmonic of the order $n'$, there would be a regulating chain which is identical with the elemnts 6', 8' and 10'.

The device in accordance with the invention will now be described in detail for the application of the method of regulation described in the foregoing. The description relates to the correction of the $n^{th}$ harmonic. In the complete apparatus, the number of identical loops corresponds to the number of harmonics to be removed. In the majority of cases, these can be limited in practice to the harmonics of the order 3 and 5.

In this example, it is proposed to regulate the acceleration $\gamma$ of the jack of the system 4.

The signal $\gamma$ is first shaped in the device 14 in order to give said signal a substantially constant rectified mean value. In fact, during the tests, the amplitude of the acceleration is very variable according to the range of frequency F considered. This is necessary in order to conform to the technological limits of the jack and also in order to obtain a realistic simulation of the environmental conditions.

The quantity which is utilized in devices for determining the minimum value of distortion is not the amplitude of the $n^{th}$ component of the acceleration ($\gamma n$) but its relative amplitude in the fundamental form $\gamma n/\gamma$. The approximate performance of this operation as well as the reduction of the dynamic range of the control signal are achieved by means of a level control system such that the instantaneous signal $\gamma$ corresponds after shaping to a substantially constant rectified mean value. As the distortion factor is lower, so the result obtained is closer to the exact value.

The signal $\gamma$ is then introduced into a homodyne filter 16 which is controlled by the generator 10 having a frequency nF. At the output of the filter 16, there is obtained the signal H which is equal to the ratio of the amplitudes of the signals $\gamma n$ and $\gamma 1$ (fundamental $\gamma$).

The signal H is then introduced into the differentiator 18 of conventional type which delivers the derivative of the signal H as a function of time. Said differentiator can advantageously be constructed in a known manner by means of an amplifier comprising a resistor at its input and a capacitor and resistor which are mounted in parallel and in negative feedback. The output of the differentiator 18 is connected to the input of the threshold device 20. This device delivers a signal having a level +V if the derivative of the signal H is positive and −V in the contrary case. The threshold device 20 is connected to a sign discriminator 22. The sign discriminator delivers a pulse I only if the voltage delivered by the threshold device 20 changes from the value −V to the value +V, that is to say if the derivative changes from a negative value to a positive value. By way of example, said discriminator can be constructed in accordance with a very well known design, essentially by means of a diode and a capacitor which is discharged under the action of the transition of the voltage applied to its terminals from the value −V to the value +V.

The above-mentioned pulse is transmitted either to the phase-regulating memory 24 or to the amplitude-regulating memory 26 by means of the switch 28 which is controlled by a sequencing clock 30. The switch 28' connects one of the two memories 24 and 26 to the device 32 for controlling the direction of progressive variation of the adjustment. There is also applied to this device a voltage which is proportional to the distortion factor H. By means of the switch 34 which is controlled by the sequencing clock 30, said device 32 is connected to the system for phase-adjustment 36 and amplitude-adjustment 38 of the signal having a frequency $n$F which is delivered by the sine-wave current generator 10. The signal nF which is adjusted in phase and in amplitude is applied to the second input of the summation device 12.

Figure 3:
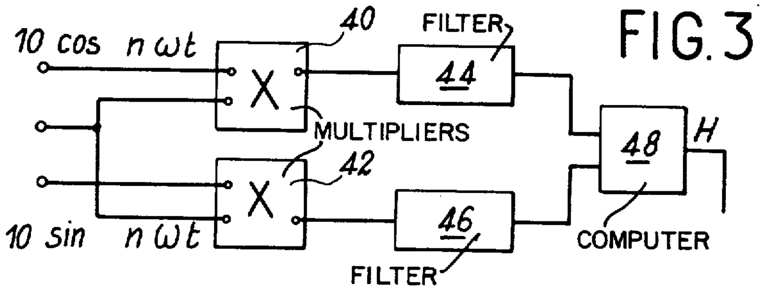
FIG. 3 shows one embodiment of the homodyne filter.

FIG. 3 shows in detail the homodyne filter 16. This filter comprises two multipliers 40 and 42, each multiplier being connected to the input of a low-pass filter (44 and 46) having a gain G at zero frequency; the multiplier 40 delivers the signal X and the multiplier 42 delivers the signal Y. The outputs of the filters 44 and 46 are fed into a computer 48 which performs on the input quantities X and Y the operation:

$$\sqrt{X^2 + Y^2}$$

This operation can also be performed by means of elementary analog circuits which are well known to those versed in the art and constructed from operational amplifiers. Use is accordingly made of two "square-law" circuits, a summation circuit and a "square-root extraction" circuit.

The multiplier is driven on the one hand by the signal $\gamma$ which is shaped in the device 14 and on the other hand by the signal 10 cos $n\omega t$ which is delivered by the generator having the frequency nF.

The signal $\gamma$ can be put in the form:

$$\gamma = 10\cos \omega t + \beta\cos(2\omega t + \phi 2) + \ldots + N\cos(n\omega t + \phi n) + \ldots + U\cos(U\omega t + \phi u)$$

if the amplitude of the fundamental of $\gamma$ is adjusted to 10 volts by means of the device 14.

The multiplier 40 divides the result of the product by 10 (amplitude of the fundamental of $\gamma$).

There is thus obtained at the output of the multiplier the signal $g$ $$g = 10\cos\omega t \cos n\omega t + \beta\cos(2\omega t + \phi 2)\cos n\omega t + \ldots$$

$$= \frac{10}{2}\cos[(1+n)\omega t] + \frac{10}{2}\cos[(1-n)\omega t] + \ldots$$

$$+ \frac{N}{2}\cos(2n\omega t + \phi n) + \frac{N}{2}\cos\phi n + \ldots + \frac{U}{2}\cos[(u-n)\omega t + \phi u]$$

$$+ \frac{U}{2}\cos[(u+n)\omega t + \phi u]$$

After passing through the filter 44, the signal $g$ becomes the signal $g'$, with:

$$g' = G\ \frac{N}{2}\cos\phi n$$

Similarly, there are introduced in the multiplier 42 the signal $\gamma$ and the signal 10 sin $n\omega t$ which is delivered by the generator 10.

There is obtained at the output of the filter 46 the signal:

$$g'' = G\ \frac{N}{2}\sin\phi n$$

The signal H at the output of the computer 48 therefore has the value:

$$H = \sqrt{G^2\ \frac{N^2}{4}\sin^2\phi n + G^2\ \frac{N^2}{4}\cos^2\phi n} = G\ \frac{N}{2}$$

which in fact represents the distortion factor in the case of the harmonic of the order $n$ $\gamma n/\gamma 1$.

Figure 5:
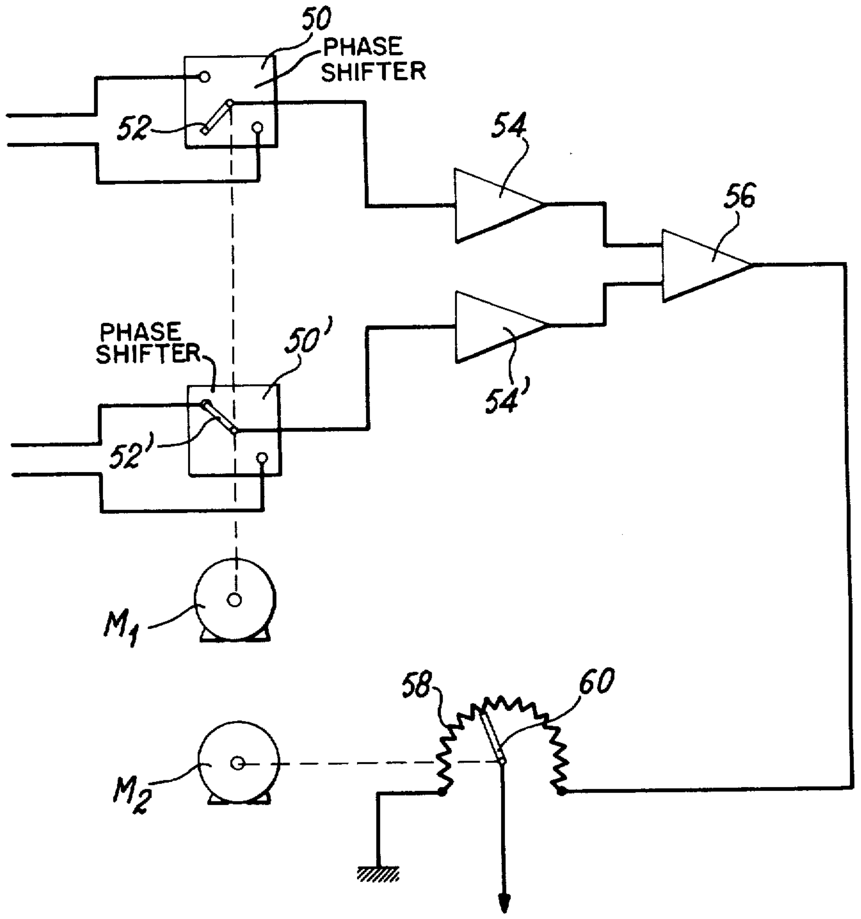
FIG. 5 shows one mode of execution of adjustment of the correcting signal both in phase and in amplitude.

There is shown in FIG. 5 one example of construction of the devices 36 and 38 for adjusting the phase and the amplitude of the correcting signal.

The phase-adjustment device 36 is essentially constituted by two adjustable phase shifters 50 and 50' of conventional type. The phase shifter 50 is driven by the signal A cos$\omega t$ which is delivered by the generator 10 and the phase shifter 50' is driven by the signal A sin $\omega t$. The sliders 52 and 52' of the phase shifters are displaced together but are inclined to each other at a constant angle of $\pi/2$. The signal A cos$\omega t$ cos $\phi$ is collected at the output of the phase shifter 50 and the signal A sin $\omega t$ sin $\phi$ is collected at the output of the phase shifter 50' (if the slider 52 makes an angle $\phi$ with the origin position). These signals are amplified in the amplifiers 54 and 54', then fed into the summation device 56. At the output of the summation device 56, there is obtained the signal:

$$A\cos(\omega t - \phi)$$

This signal is applied to the input of a rotary-contact potentiometer 58' having a closed track (which constitutes the amplitude-adjustment device 38). There is obtained on the slider 60 of said potentiometer the signal:

$$K.A.\cos(\omega t - \phi)$$

The sliders 52 and 52' are driven by the two-way reduction-gear motor $M_1$ of known type.

The slider 60 is driven by a second two-way reduction-gear motor $M_2$ which is also of known type.

The speed of rotation of each motor is regulated by means of a voltage which is proportional to the amplitude of the signal H whilst the direction of rotation of the motor changes at each pulse I.

The operation of the regulating loop corresponding to the $n^{th}$ harmonic will now be explained.

Under the action of the control signal of frequency F, the system 4 delivers a sine-wave signal $\gamma$ which exhibits a certain distortion factor in the case of the $n^{th}$ harmonic. By means of the device 14, the fundamental of said signal is given a substantially constant amplitude. The signal H which is proportional to the distortion factor $\gamma n/\gamma 1$ is produced in the filter 16. Said signal H is derived in the differentiator 18. There is obtained at its output a voltage which is proportional to the derivative of H. In the regulating loop, it is sought to reduce and practically cancel the signal H. To reduce the amplitude of the signal H until it becomes zero is tantamount to making its derivative negative and to cancelling this latter. As has been stated earlier, the variation in phase and in amplitude of the correcting signal is obviously carried out both in sign and in absolute value. It can be stated that the correction takes place in the right direction if the derivative is negative or if it passes from the plus sign to the minus sign. On the contrary, the correction begins to take place in the wrong direction if the derivative passes from the minus sign to the plus sign. It can be stated that in this case, the optimum point of adjustment has been overstepped and the direction of the correction must accordingly be reversed. This is the function performed by the sign discriminator 22. Since the corrections of amplitude and of phase are carried out in alternate sequence, said pulse is stored in the memory which does not correspond to the parameter being treated. The device for correcting the other parameter produces action on the signal of frequency $n$F which is delivered by the generator 10.

In other words, if T designates the period of the sequencing clock 30, a regulation of the output signal as a function of the phase shift takes place during a time interval T/2 in respect of a constant amplitude of the correcting signal. During the following time interval T/2, there takes place a regulation of the output signal as a function of the amplitude in respect of a constant phase shift of the correcting signal. During the adjustment of one parameter, the memory corresponding to the other parameter is disconnected from the discriminator 22; the orders for changing the direction of variation in the adjustment of the first parameter will therefore be without any influence on the adjustment of the second parameter during the following period T/2.

Figure 4:
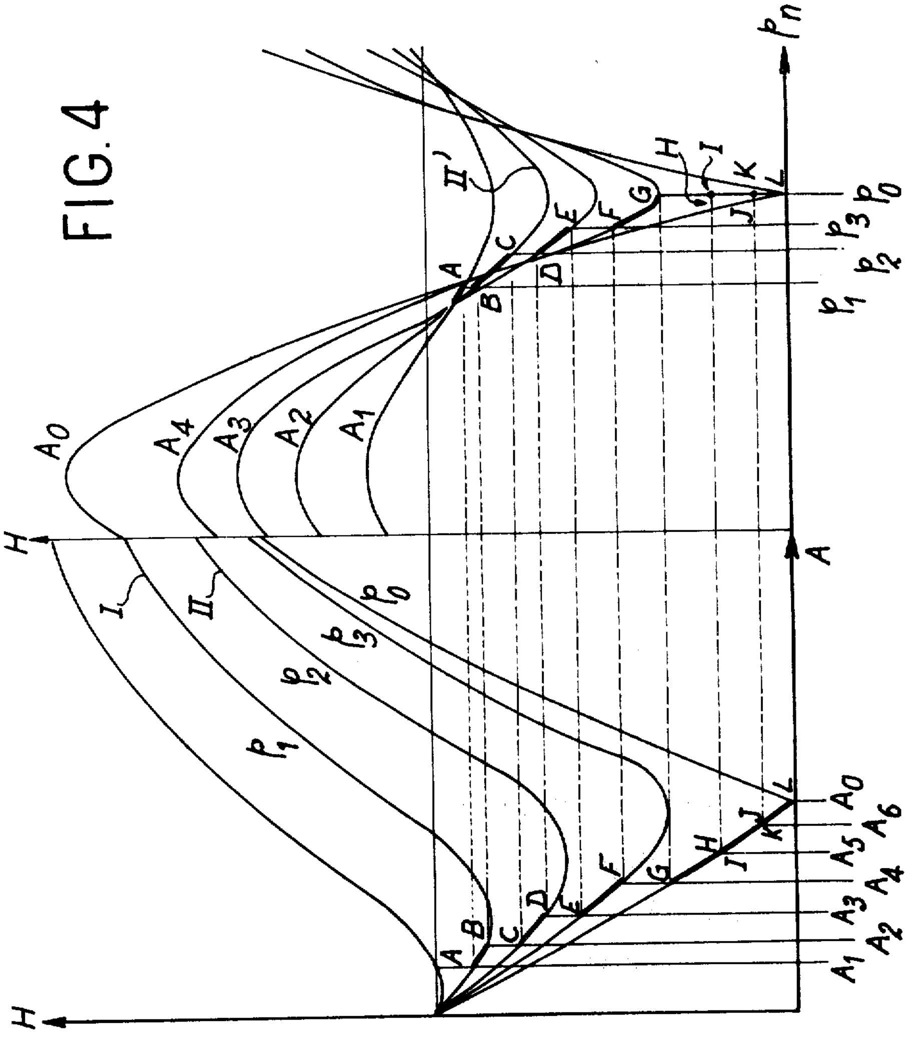
FIG. 4 is a plot of the curves which show the alternate operation of the regulating loop.

This operation in alternate sequence is illustrated by the curves of FIG. 4. On the left-hand portion, there are shown the variations in the distortion factor H in the case of the $n^{th}$ harmonic as a function of the amplitude A of the correcting signal in respect of a given phase shift of said signal. The right-hand portion shows the variations in the distortion factor H as a function of the phase shift in respect of a given amplitude A.

It will now be postulated that, at the outset, the amplitude is caused to vary with an initial phase shift $\phi 1$. The starting point is designated as A (amplitude A1, phase $\phi 1$). Since the phase is constant, one moves along the curve I which gives the influence of the variation in amplitude on the distortion factor. At the end of the time interval T/2, one reaches point B of curve I, the coordinates of the point B being A2, $\phi 1$. During the following period T/2, one moves from point B to point C on the curve II' which is representative of the variations in the distortion factor as a function of the phase shift in respect of the amplitude A2. During the following period T/2, one moves from point C to point D on the curve II which corresponds to the fixed phase shift $\phi 2$.

The process is repeated up to the point L (amplitude A0, phase shift $\phi 0$) at which the distortion factor H is zero.

In FIG. 4, it has been assumed for the sake of enhanced simplicity that, in the case of both phase adjustment and amplitude adjustment, a zero distortion factor was attained without overstepping the minimum, that is to say without encountering the minus-plus transition in the sign of the derivative of H. Should this not be the case, there would be exactly the same types of curves but the values A1, A2 . . . and $\phi 1$, $\phi 2$ would then no longer be in increasing order of magnitude.

It is readily apparent that the two adjustment time intervals can in some cases be different.

In a preferred mode of execution, the rate of variation of parameters increases linearly with the distortion factor so as to obtain better stability of the regulating loop about the point of optimum adjustment.

A prototype constructed in accordance with the foregoing description has the following characteristics:

bottom limit of correction: 10 cps of fundamental frequency rates of correction in phase: maximum 12° per second: average 1°30 per second rates of correction in amplitude: maximum 7 percent per second average 1 percent per second.

What we claim is:

1. A method for correcting harmonic distortions of a periodic signal emitted by a system controlled by a periodic pilot signal having a frequency F, said periodic signal comprising a fundamental and harmonics, the steps of correcting separately the distortions caused by each harmonic, the cyclic correction of each harmonic comprising the steps of measuring the value of the ratio of the amplitude of the harmonic with respect to the amplitude of the fundamental and elaborating a signal H having an amplitude proportional to this ratio, elaborating a periodic signal of fixed frequency $n$F where $n$ is the value of the harmonic, said elaborated periodic signal being said pilot signal, varying the phase and amplitude of the corrective signal with respect to the pilot signal with a speed of variation proportional to the value of said ratio, deriving said signal H as a derived signal H and detecting the times when said derived signal H passes from the minus sign to the plus sign, reversing the direction of the variation of said corrective signal at each of these times, said pilot signal thus elaborated producing a treated corrective signal and superimposing the treated corrective signal on the pilot signal whereby the distortions caused by each harmonic of said periodic signal are eliminated.

2. The method as described in claim 1, including the step of successively reversing the directions of variation of the corrective signal both in phase and in amplitude.

3. A device for correction of the distortions of amplitude of a periodic signal emitted by a system controlled by a periodic pilot signal of frequency F, said emitted periodic signal having a fundamental and harmonics, the distortions of amplitude due to each harmonic being cyclically corrected, comprising a plurality of identical regulating loops, the number of said loops being equal to the number of harmonics, the regulating loop corresponding to the harmonic of range n comprising means for elaborating a signal H having an amplitude proportional to the value of the ratio of the amplitude of the harmonic n with respect to the amplitude of the fundamental, means for elaborating a signal of frequency nF as a corrective signal, means for varying the amplitude of the corrective signal with a speed proportional to the amplitude of signal H, means for varying the phase of the corrective signal with respect to the phase of the pilot signal, means for deriving a signal H to form a derived signal H from the minus sign to the plus sign and for elaborating a signal I at each detection, means controlled by said signal I for reversing the direction of variation of the phase of the corrective signal, means controlled by said signal I for reversing the direction of variation of the amplitude of the corrective signal and means for superimposing the thus treated corrective signal on the pilot signal whereby the distortions caused by each harmonic of said periodic signal are eliminated.

4. A device according to claim 3, wherein the pulse I is fed into a switch controlled by a sequencing clock, each output of said switch being connected to the input of a memory, each memory being connected through a second switch also controlled by said sequencing clock to the means for adjusting the phase and the amplitude of the correcting signal.

5. A device according to claim 3, wherein the means for producing the signal H comprise:

means for giving a constant rectified value to the signal emitted by the system, two multipliers having one input connected to the output of said means, the other input of one of said multipliers being driven by the signal having a frequency nF and the other input of the other multiplier being driven by the same signal having the frequency $n$F and phase-shifted by $\pi/2$, two low-pass filters each connected to the output of one of said multipliers providing signals X and Y, and elaborating means connected to the output of said multipliers performing on the input variables X and Y the operation:

$$\sqrt{X^2 + Y^2}.$$

* * * * *